US012679464B2

(12) United States Patent
Quan et al.

(10) Patent No.: US 12,679,464 B2
(45) Date of Patent: Jul. 14, 2026

(54) VEHICLE BODY FRAME AND VEHICLE WITH SAME

(71) Applicant: BYD COMPANY LIMITED, Shenzhen (CN)

(72) Inventors: Yi Quan, Shenzhen (CN); Hao Zhong, Shenzhen (CN); Junfei Yan, Shenzhen (CN); Yu Wang, Shenzhen (CN); Tengyong Liu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 365 days.

(21) Appl. No.: 18/373,204

(22) Filed: Sep. 26, 2023

(65) Prior Publication Data

US 2024/0017769 A1     Jan. 18, 2024

Related U.S. Application Data

(63) Continuation of application No. PCT/CN2022/094613, filed on May 24, 2022.

(30) Foreign Application Priority Data

Jun. 29, 2021     (CN) .......................... 202110732244.9

(51) Int. Cl.
B62D 21/15          (2006.01)
B62D 21/03          (2006.01)
(Continued)

(52) U.S. Cl.
CPC ........... B62D 21/152 (2013.01); B62D 21/03 (2013.01); B62D 25/04 (2013.01); B62D 25/145 (2013.01); B62D 25/2018 (2013.01)

(58) Field of Classification Search
CPC ...... B62D 21/152; B62D 21/03; B62D 25/04; B62D 25/145; B62D 25/2018
See application file for complete search history.

(56) References Cited

U.S. PATENT DOCUMENTS 2,901,266 A * 8/1959 Lindsay ................. B62D 21/02
                                                          280/785
3,765,715 A * 10/1973 Franchini ............. B62D 25/145
                                                          296/187.05
(Continued)

FOREIGN PATENT DOCUMENTS

CN          205131383 U     4/2016
CN          106882272 A     6/2017
(Continued)

OTHER PUBLICATIONS

International Search Report and Written Opinion for Application No. PCT/CN2022/094613, mailed on Aug. 17, 2022, 9 pages.
(Continued)

*Primary Examiner* — Jonathan Malikasim
(74) *Attorney, Agent, or Firm* — Sheppard Mullin Richter & Hampton LLP

(57)          ABSTRACT

A vehicle body frame includes: a front transverse beam, a first front longitudinal beam, and a second front longitudinal beam. The first front longitudinal beam and the second front longitudinal beam are disposed at an interval along a left-and-right direction, each of the first front longitudinal beam and the second front longitudinal beam includes a longitudinal-beam rear-section front portion and a longitudinal-beam rear-section rear portion connected to each other, the longitudinal-beam rear-section front portion is connected to the front transverse beam, and an upper surface of the longitudinal-beam rear-section front portion and an upper surface of the front transverse beam are located in a same plane.

20 Claims, 12 Drawing Sheets

(51) Int. Cl.
  B62D 25/04 (2006.01)
  B62D 25/14 (2006.01)
  B62D 25/20 (2006.01)

(56) References Cited

U.S. PATENT DOCUMENTS

| | | | | |
|---|---|---|---|---|
| 5,921,578 | A * | 7/1999 | Sekita | B60K 1/04 |
| | | | | 296/203.02 |
| 6,296,300 | B1 * | 10/2001 | Sato | B62D 29/008 |
| | | | | 296/203.02 |
| 6,299,237 | B1 * | 10/2001 | Benz | B62D 25/08 |
| | | | | 296/203.02 |
| 6,705,670 | B2 * | 3/2004 | Forssell | B62D 25/082 |
| | | | | 296/203.02 |
| 8,702,148 | B2 | 4/2014 | Ichikawa | |
| 2017/0073013 | A1 | 3/2017 | Sasaki | |
| 2019/0016387 | A1 | 1/2019 | Elbkaily et al. | |
| 2020/0114747 | A1 * | 4/2020 | Lian | B62D 21/02 |

FOREIGN PATENT DOCUMENTS

| | | |
|---|---|---|
| CN | 107554609 A | 1/2018 |
| CN | 109204460 A | 1/2019 |
| CN | 109204464 A | 1/2019 |
| CN | 109204465 A | 1/2019 |
| CN | 109204467 A | 1/2019 |
| CN | 208682932 U | 4/2019 |
| CN | 111619670 A | 9/2020 |
| CN | 213007574 U | 4/2021 |
| JP | S60145974 U | 9/1985 |
| JP | H06144297 A | 5/1994 |
| JP | 2009-255883 A | 11/2009 |
| JP | 2011-073495 A | 4/2011 |
| JP | 2014043133 A | 3/2014 |
| JP | 2017056798 A | 3/2017 |
| KR | 10-1999-0082416 A | 11/1999 |
| WO | 1997029005 A1 | 8/1997 |
| WO | 2011155321 A1 | 12/2011 |

OTHER PUBLICATIONS

Examination Report No. 1 dated Sep. 20, 2024, issued in related Australian Patent Application No. 2022303792 (4 pages).

Extended European Search Report dated Sep. 20, 2024, issued in related European Patent Application No. 22831521.4 (9 pages).

Notice of Reasons for Refusal dated Aug. 6, 2024, issued in related Japanese Patent Application No. 2023-556485, with English machine translation (12 pages).

Final Notification of Reasons for Refusal dated Mar. 4, 2025, issued in related Japanese Patent Application No. 2023-556485, with English machine translation (12 pages).

Request for the Submission of an Opinion dated Feb. 27, 2025, issued in related Korean Patent Application No. 10-2023-7032539, with English machine translation (12 pages).

First Office Action and Search Report dated Sep. 29, 2022, issued in related Chinese Patent Application No. 202110732244.9, with English machine translation (14 pages).

Second Office Action dated Dec. 20, 2022, issued in related Chinese Patent Application No. 202110732244.9, with English machine translation (14 pages).

* cited by examiner

Front

Rear

Left ◀━━━━━━━▶ Right

A-A

B–B

VEHICLE BODY FRAME AND VEHICLE WITH SAME

CROSS-REFERENCE TO RELATED APPLICATIONS

This application is a Continuation application of International Patent Application No. PCT/CN2022/094613, filed on May 24, 2022, which is based on and claims priority to and benefits of Chinese Patent Application No. 202110732244.9, filed on Jun. 29, 2021. The entire content of all of the above-referenced applications is incorporated herein by reference.

FIELD

The present disclosure relates to a vehicle body frame and a vehicle with the same.

BACKGROUND

Front collision is one of important evaluation standards for rationality of a front structure of a vehicle. In order to protect passengers in a passenger cabin when a vehicle is subject to a front collision, in a process of rearward transferring of a collision force of the front collision, it is necessary to absorb the collision force through deformation of the front structure of the vehicle.

As shown in FIG. 1, a vehicle body frame V in the related art is usually provided with a front longitudinal beam 100' and a front transverse beam 200'. The front longitudinal beam 100' is connected with the front transverse beam 200'. Thus, the front longitudinal beam 100' and the front transverse beam 200' can withstand the collision force exerted on the vehicle to avoid the front structure of the vehicle from deforming and intruding into the passenger cabin, so as to protect of the passengers. However, the connection between the front longitudinal beam 100' and the front transverse beam 200' may cause the front transverse beam 200' to flip under the force, so that the front transverse beam 200' has low effectiveness in front resistance, and there is a greater possibility that the front structure of the vehicle intrudes into the passenger cabin.

SUMMARY

The present disclosure solves at least one of the technical problems in the related art. Therefore, the present disclosure provides a vehicle body frame.

The present disclosure further provides a vehicle with a vehicle body frame provided in the above embodiment.

An embodiment of a first aspect of the present disclosure provides a vehicle body frame, which includes: a front transverse beam, a first front longitudinal beam, and a second front longitudinal beam. The first front longitudinal beam and the second front longitudinal beam are disposed at an interval along a left-and-right direction, each of the first front longitudinal beam and the second front longitudinal beam includes a longitudinal-beam rear-section front portion and a longitudinal-beam rear-section rear portion connected to each other, the longitudinal-beam rear-section front portion is connected to the front transverse beam, and an upper surface of the longitudinal-beam rear-section front portion and an upper surface of the front transverse beam are located in a same plane.

According to some embodiments of the present disclosure, each of the first front longitudinal beam and the second front longitudinal beam further includes: a first front connection plate, where the first front connection plate is connected to the front transverse beam and the corresponding longitudinal-beam rear-section front portion, and the first front connection plate is located on a first side of the corresponding longitudinal-beam rear-section front portion; and a second front connection plate, where the second front connection plate is connected to the front transverse beam and the corresponding longitudinal-beam rear-section front portion, and the second front connection plate is located on another side of the corresponding longitudinal-beam rear-section front portion.

According to some embodiments of the present disclosure, the vehicle body frame further includes: a central channel, where the central channel is located behind the front transverse beam in a front-and-rear direction and connected to the front transverse beam; and a first scuff plate and a second scuff plate, where the first scuff plate and the second scuff plate are disposed at an interval along the left-and-right direction, a first side of the longitudinal-beam rear-section rear portion of the first front longitudinal beam is connected with the first scuff plate, and a second side of the longitudinal-beam rear-section rear portion of the first front longitudinal beam is connected with the central channel, and a first side of the longitudinal-beam rear-section rear portion of the second front longitudinal beam is connected with the second scuff plate, and a second side of the longitudinal-beam rear-section rear portion of the second front longitudinal beam is connected with the central channel.

According to some embodiments of the present disclosure, the longitudinal-beam rear-section rear portion of the first front longitudinal beam is connected to one side of the first scuff plate close to the second scuff plate, and the longitudinal-beam rear-section rear portion of the second front longitudinal beam is connected to one side of the second scuff plate close to the first scuff plate.

According to some embodiments of the present disclosure, each longitudinal-beam rear-section rear portion is connected to a lower surface of the corresponding longitudinal-beam rear-section front portion and connected to a lower surface of the central channel.

According to some embodiments of the present disclosure, a width of each longitudinal-beam rear-section rear portion along the left-and-right direction gradually increases from front to rear.

According to some embodiments of the present disclosure, the vehicle body frame further includes: a first A pillar and a second A pillar. The first A pillar and the second A pillar are disposed at an interval along the left-and-right directions. Two ends of the front transverse beam are respectively connected to the first A pillar and the second A pillar. The first A pillar is connected with the first scuff plate. The second A pillar is connected with the second scuff plate. One side of the longitudinal-beam rear-section rear portion of the first front longitudinal beam is connected with the first A pillar. One side of the longitudinal-beam rear-section rear portion of the second front longitudinal beam is connected with the second A pillar.

According to some embodiments of the present disclosure, each longitudinal-beam rear-section rear portion includes: a rear-section inner side portion, where the rear-section inner side portion is connected to the central channel and the corresponding longitudinal-beam rear-section front portion, and the rear-section inner side portion gradually tilts downward from front to rear; and a rear-section outer side portion, where the rear-section outer side portion is connected to the corresponding first scuff plate or second scuff plate, the corresponding first A pillar or second A pillar, the corresponding rear-section inner side portion, and the corresponding longitudinal-beam rear-section front portion, and the rear-section outer side portion is located on a first side of the corresponding rear-section inner side portion facing away from the central channel. A distance between a second side of the rear-section inner side portion of each longitudinal-beam rear-section rear portion facing away from the rear-section outer side portion of the longitudinal-beam rear-section rear portion and one side of the rear-section outer side portion of the longitudinal-beam rear-section rear portion facing away from the rear-section inner side portion of the longitudinal-beam rear-section rear portion gradually increases from front to rear.

According to some embodiments of the present disclosure, each rear-section inner side portion includes: a rear-section inner plate, where a front end of the rear-section inner plate is connected to the corresponding longitudinal-beam rear-section front portion, and a first side of the rear-section inner plate facing the central channel bends downward and is connected to the central channel; and a rear-section outer plate, where a front end of the rear-section outer plate is connected to the corresponding longitudinal-beam rear-section front portion, a first side of the rear-section outer plate facing away from the central channel bends downward and is connected to the corresponding rear-section outer side portion, and a second side of the rear-section outer plate facing the central channel is connected to the rear-section inner plate.

According to some embodiments of the present disclosure, each rear-section inner side portion further includes: a front auxiliary vehicle body frame support plate. A front end of the front auxiliary vehicle body frame support plate is connected to the corresponding longitudinal-beam rear-section front portion. The front auxiliary vehicle body frame support plate is connected to an upper surface of the rear-section inner plate and an upper surface of the rear-section outer plate. The front auxiliary vehicle body frame support plate includes a front auxiliary vehicle body frame mounting hole.

According to some embodiments of the present disclosure, the front auxiliary vehicle body frame support plate includes: a support body, where the support body is spaced from the rear-section inner plate and the rear-section outer plate in a up-and-down direction, and the front auxiliary vehicle body frame mounting hole is disposed in the support body; a first vertical plate, where the first vertical plate is connected to the support body and bends downward, and the first vertical plate is connected to the rear-section inner plate and the rear-section outer plate; a second vertical plate, where the second vertical plate is connected to the support body and bends downward, and the second vertical plate is connected to the rear-section inner plate; and a third vertical plate, where the third vertical plate is connected to the support body and bends upward, and the third vertical plate is connected to a first side of the rear-section inner plate facing the central channel.

According to some embodiments of the present disclosure, each rear-section outer side portion includes: a rear-section closing plate, where the rear-section closing plate extends along the left-and-right directions, and the rear-section closing plate is connected with the corresponding first A pillar or second A pillar, the front transverse beam, the corresponding longitudinal-beam rear-section front portion, and the corresponding rear-section inner side portion; and a first rear connection plate, where the first rear connection plate is located behind the rear-section closing plate in a front-and-rear direction, and the first rear connection plate is connected with the corresponding first scuff plate or second scuff plate, the rear-section closing plate, and the corresponding rear-section inner side portion.

According to some embodiments of the present disclosure, each rear-section outer side portion further includes: a second rear connection plate. The second rear connection plate includes a connection portion and a curved surface portion. The connection portion is connected with the rear-section closing plate and the first rear connection plate. The curved surface portion extends rearward from the connection portion and has an arc-shaped cross section. The curved surface portion is connected to an upper surface of the first rear connection plate. The connection portion and the curved surface portion are connected to the rear-section inner side portion.

According to some embodiments of the present disclosure, the vehicle body frame further includes: a dash board lower transverse beam. The dash board lower transverse beam is connected to the front transverse beam and the central channel. The dash board lower transverse beam is located below the central channel in an up-and-down direction and behind the front transverse beam in the front-and-rear direction. Two ends of the dash board lower transverse beam are respectively connected to the longitudinal-beam rear-section rear portion of the first front longitudinal beam and the longitudinal-beam rear-section rear portion of the second front longitudinal beam.

According to some embodiments of the present disclosure, the vehicle body frame further includes: a dash board reinforcing plate. The dash board reinforcing plate includes a first plate body, a second plate body, and a third plate body disposed along the left-and-right directions. The second plate body is located between the first plate body and the third plate body. The first plate body is connected to the front transverse beam and the longitudinal-beam rear-section rear portion of the first front longitudinal beam. The third plate body is connected to the front transverse beam and the longitudinal-beam rear-section rear portion of the second front longitudinal beam. The second plate body is connected to the front transverse beam, the dash board lower transverse beam, and the central channel.

According to some embodiments of the present disclosure, the vehicle body frame further includes: a floor. The central channel, each longitudinal-beam rear-section rear portion, and the dash board reinforcing plate are connected to the floor. A lower surface of each longitudinal-beam rear-section rear portion, a lower surface of the dash board lower transverse beam, and a lower surface of the dash board reinforcing plate are not lower than a lower surface of the floor.

An embodiment of a second aspect of the present disclosure provides a vehicle, which includes: a vehicle body frame according to the embodiment of the first aspect of the present disclosure.

Some of the additional aspects and advantages of the present disclosure will be provided in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible from the following descriptions of the embodiments with reference to the accompanying drawings. In the figures.

DETAILED DESCRIPTION

Figure 1:
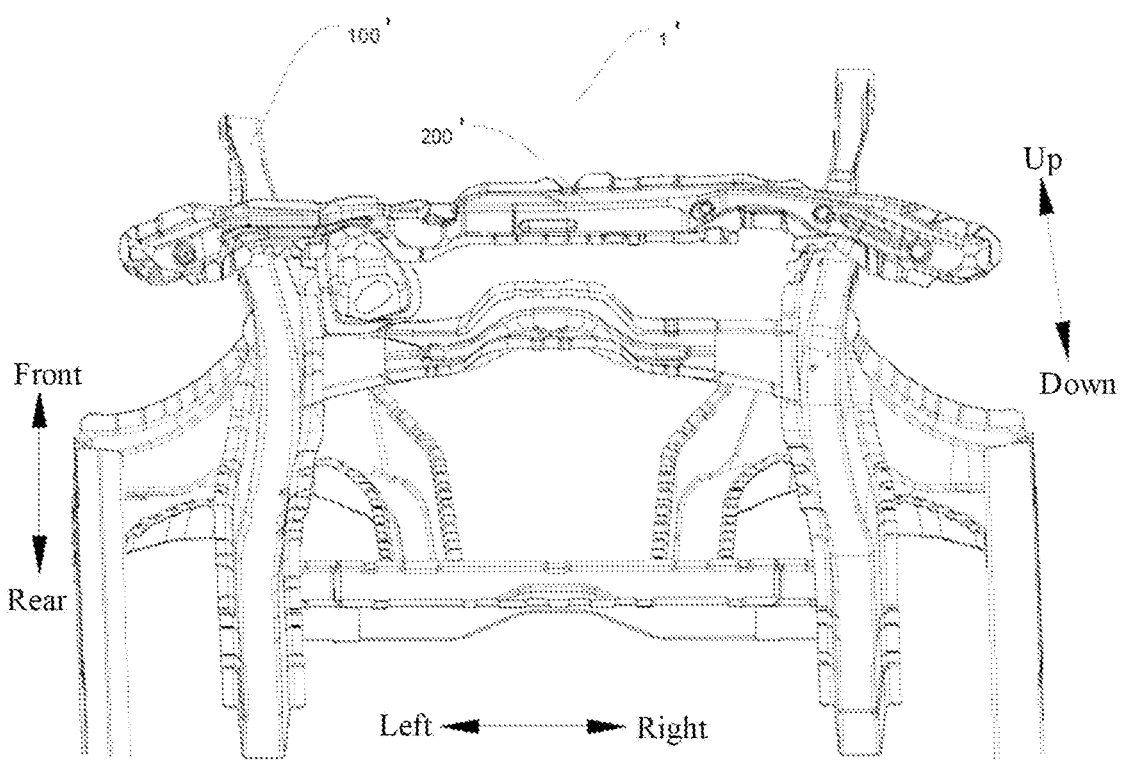
FIG. 1 is a schematic structural view of a vehicle body frame in related art.

The embodiments of the present disclosure are described in detail below, and the embodiments described with reference to the accompanying drawings are examples.

In the description of the present disclosure, it should be understood that orientation or position relationships indicated by terms such as "center", "longitudinal", "transverse", "length", "width", "thickness", "up", "down", "front", "rear", "left", "right", "vertical", "horizontal", "top", "bottom", "inside", "outside", "clockwise", "anticlockwise", "axial", "radial", and "circumferential" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limitation on the present disclosure.

In the description of the present disclosure, "multiple" means two or more.

A vehicle body frame 1 according to an embodiment of the present disclosure is described below with reference to the accompanying drawings.

Referring to FIG. 2 to FIG. 12, the vehicle body frame 1 includes a front transverse beam 100, a first front longitudinal beam 220, and a second front longitudinal beam 320.

The first front longitudinal beam 220 and the second front longitudinal beam 320 are arranged at an interval along left-and-right directions. Each of the first front longitudinal beam 220 and the second front longitudinal beam 320 includes a longitudinal-beam rear-section front portion 410 and a longitudinal-beam rear-section rear portion 420 connected to each other. The longitudinal-beam rear-section front portion 410 is connected to the front transverse beam 100 and is located in front of the front transverse beam 100. An upper surface of the longitudinal-beam rear-section front portion 410 and an upper surface of the front transverse beam 100 are located in a same plane. A lower surface of the longitudinal-beam rear-section front portion 410 is not higher than a lower surface of the front transverse beam 100. The longitudinal-beam rear-section rear portion 420 is connected to the corresponding longitudinal-beam rear-section front portion 410.

It should be noted that, the longitudinal-beam rear-section front portion 410 and the longitudinal-beam rear-section rear portion 420 are both a rear section of the corresponding front longitudinal beam, and only a front section of the front longitudinal beam is illustrated in the accompanying drawings.

According to the vehicle body frame 1 in this embodiment of the present disclosure, the longitudinal-beam rear-section front portion 410 is connected to the front transverse beam 100 and is located in front of the front transverse beam 100, and the upper surface of the longitudinal-beam rear-section front portion 410 and the upper surface of the front transverse beam 100 are located in the same plane. The lower surface of the longitudinal-beam rear-section front portion 410 may be not higher than the lower surface of the front transverse beam 100. In this case, the front transverse beam 100 can increase a support force for the longitudinal-beam rear-section front portion 410 to improve the ability of the vehicle body frame 1 to resist a frontal collision. Moreover, compared with a vehicle body frame in related art, a collision force of the longitudinal-beam rear-section front portion 410 to the front transverse beam 100 in up-and-down directions is more even, so the front transverse beam 100 will not flip due to the force. Therefore, the probability that the front transverse beam 100 intrudes into a passenger cabin due to the frontal collision is reduced, the safety is greatly improved, and the front transverse beam 100 has a good support effect on the longitudinal-beam rear-section front portion 410.

In addition, each of the first front longitudinal beam 220 and the second front longitudinal beam 320 includes the longitudinal-beam rear-section front portion 410 and the longitudinal-beam rear-section rear portion 420 connected to each other. The longitudinal-beam rear-section rear portion 420 is connected to the corresponding longitudinal-beam rear-section front portion 410. In this case, both the rear section of the first front longitudinal beam 220 and the rear section of the second front longitudinal beam 320 are divided into two portions, thereby ensuring integrity of the first front longitudinal beam 220 and the second front longitudinal beam 320 and effectiveness of frontal collision resistance, and also being beneficial for a rear surface of the longitudinal-beam rear-section front portion 410 to stop at a front surface of the front transverse beam 100, so as to facilitate connection between the longitudinal-beam rear-section front portion 410 and the front transverse beam 100.

Therefore, the vehicle body frame 1 according to this embodiment of the present disclosure has the advantages of high safety, good resistance to a frontal collision, convenient connection, and the like.

According to some embodiments of the present disclosure, referring to FIG. 2 to FIG. 12, the vehicle body frame 1 may include a first A pillar 200, a second A pillar 300, a central channel 500, a first scuff plate 460, and a second scuff plate 470.

The first A pillar 200 and the second A pillar 300 are arranged at an interval along the left-and-right directions. Two ends of the front transverse beam 100 are respectively connected to the first A pillar 200 and the second A pillar 300. The central channel 500 is located behind (e.g., in a front-and-rear direction) the front transverse beam 100 and is connected to the front transverse beam 100. The first scuff plate 460 and the second scuff plate 470 are arranged at an interval along the left-and-right directions. The first scuff plate 460 is connected with the first A pillar 200. The second scuff plate 470 is connected with the second A pillar 300. One side of the longitudinal-beam rear-section rear portion 420 of the first front longitudinal beam 220 is connected with the first scuff plate 460 and another side is connected with the central channel 500. One side of the longitudinal-beam rear-section rear portion 420 of the second front longitudinal beam 320 is connected with the second scuff plate 470 and another side is connected with the central channel 500. A lower surface of the longitudinal-beam rear-section rear portion 420 may be lower than the lower surface of the longitudinal-beam rear-section front portion 410.

For example, a left side of the longitudinal-beam rear-section rear portion 420 of the first front longitudinal beam 220 is connected with the first scuff plate 460 and a right side is connected with the central channel 500. A right side of the longitudinal-beam rear-section rear portion 420 of the second front longitudinal beam 320 is connected with the second scuff plate 470 and a left side is connected with the central channel 500.

For example, the front transverse beam 100 may be connected with the first A pillar 200 and the second A pillar 300 in a manner of two-row welding, and a height dimension of a rear side surface of the front transverse beam 100 is the same as or similar to a height dimension of a front end surface of the central channel 500, so that the central channel 500 can form a more comprehensive support for the front transverse beam 100 in the up-and-down directions. Moreover, the longitudinal-beam rear-section rear portion 420 of the first front longitudinal beam 220 may be welded with the longitudinal-beam rear-section front portion 410 of the first front longitudinal beam 220. The longitudinal-beam rear-section rear portion 420 of the second front longitudinal beam 320 may be welded with the longitudinal-beam rear-section front portion 410 of the second front longitudinal beam 320. The longitudinal-beam rear-section rear portion 420 of the first front longitudinal beam 220 is welded with the first scuff plate 460 and the central channel 500. The longitudinal-beam rear-section rear portion 420 of the second front longitudinal beam 320 is welded with the second scuff plate 470 and the central channel 500.

It can be understood that the lower surface of the longitudinal-beam rear-section rear portion 420 of the first front longitudinal beam 220 is connected to the lower surface of the longitudinal-beam rear-section front portion 410 of the first front longitudinal beam 220. The lower surface of the longitudinal-beam rear-section rear portion 420 of the second front longitudinal beam 320 is connected to the lower surface of the longitudinal-beam rear-section front portion 410 of the second front longitudinal beam 320.

Therefore, each longitudinal-beam rear-section front portion 410 can form a "T"-shaped structure with the front transverse beam 100, and the central channel 500 and the front transverse beam 100 can also form a "T"-shaped structure. The two front longitudinal beams can transfer a force to the central channel 500 and the two A pillars through the front transverse beam 100. In this case, when a vehicle is subjected to a frontal collision, a collision force suffered by the longitudinal-beam rear-section front portion 410 can be transferred to the two A pillars and the central channel 500 along the front transverse beam 100, and the front transverse beam 100, the central channel 500, and the two A pillars can provide a stable support for the two longitudinal-beam rear-section front portions 410, thereby avoiding a front structure of the vehicle body frame 1 from moving rearward and squeezing a space of a passenger cabin, and ensuring high safety for passengers.

In addition, the first scuff plate 460, the second scuff plate 470, and the central channel 500 can provide a support for the longitudinal-beam rear-section front portion 410 through the longitudinal-beam rear-section rear portion 420, so that the support on the longitudinal-beam rear-section front portion 410 in front-and-rear directions is more sufficient, and positional stability of the longitudinal-beam rear-section front portion 410 is greatly improved. In this case, when a vehicle is subjected to a collision, a portion of the collision force suffered by the longitudinal-beam rear-section front portion 410 can be transferred to the central channel 500 and the two scuff plates through the longitudinal-beam rear-section rear portion 420, and the front structure of the vehicle body frame 1 is less likely to move rearward and squeeze the space of the passenger cabin, thereby ensuring higher safety of the passengers. The lower surface of the longitudinal-beam rear-section rear portion 420 is lower than the lower surface of the longitudinal-beam rear-section front portion 410, so as to facilitate connection between the longitudinal-beam rear-section rear portion 420 and the corresponding scuff plate.

In addition, stress borne by the first A pillar 200 may be transferred by the first scuff plate 460, and stress borne by the second A pillar 300 may be transferred by the second scuff plate 470. Compared with a vehicle body frame 1' in which a front longitudinal beam 100' is not connected with a scuff plate in related art, the vehicle body frame 1 in the embodiment of the present disclosure fully uses the front transverse beam 100, the two A pillars, the two scuff plates, and the central channel 500 to support the first front longitudinal beam 220 and the second front longitudinal beam 320; the front structure of the vehicle body frame 1 has more force transfer paths in the left-and-right directions and the front-and-rear directions; and the vehicle body frame 1 has higher integrity, thereby improving the ability of the vehicle body frame 1 to resist the frontal collision.

Figure 4:
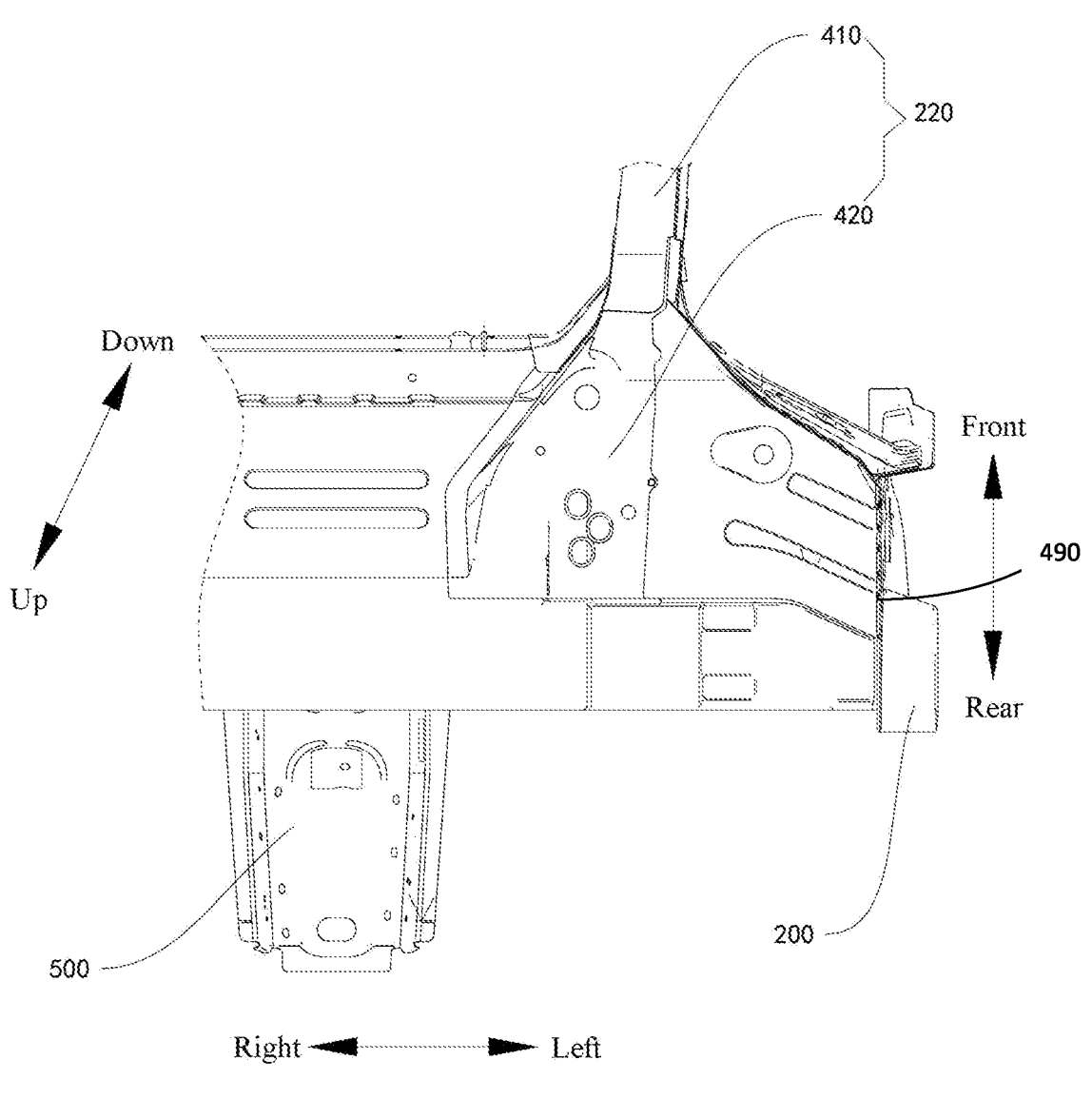
FIG. 4 is a schematic view of connection among a longitudinal-beam rear-section front portion, a longitudinal-beam rear-section rear portion, and an A pillar of a vehicle body frame according to an embodiment of the present disclosure.

According to some embodiments of the present disclosure, referring to FIG. 4, two sides (such as a left side and a right side) of each longitudinal-beam rear-section rear portion 420 are away from each other gradually from front to rear. That is, one side of each longitudinal-beam rear-section rear portion 420 is away from another side of the longitudinal-beam rear-section rear portion 420 gradually from the front to the rear, and the foregoing another side of the longitudinal-beam rear-section rear portion 420 is also away from the foregoing side of the longitudinal-beam rear-section rear portion 420 gradually from the front to the rear. Therefore, the two sides of each longitudinal-beam rear-section rear portion 420 form a "herringbone" structure from the front to the rear.

In this case, cooperation between the longitudinal-beam rear-section rear portion 420 and remaining structures of the vehicle body frame 1 is more reasonable. A contact area between the two longitudinal-beam rear-section rear portions 420 and the central channel 500, the first scuff plate 460, and the second scuff plate 470 is larger, and a force transfer structure of the vehicle body frame 1 is more stable, thereby being beneficial for protecting passenger safety.

According to some embodiments of the present disclosure, referring to FIG. 4, each longitudinal-beam rear-section rear portion 420 is connected to the lower surface of the corresponding longitudinal-beam rear-section front portion 410 and is connected to the lower surface of the central channel 500, thereby increasing force transfer efficiency of each longitudinal-beam rear-section rear portion 420 and the central channel 500 in the up-and-down directions.

When a vehicle is subjected to a frontal collision, an upper portion of the longitudinal-beam rear-section front portion 410 transfers a portion of the collision force to the central channel 500, the first A pillar 200, and the second A pillar 300 through the front transverse beam 100, and a lower portion of the longitudinal-beam rear-section front portion 410 transfers another portion of the collision force to the central channel 500, the first scuff plate 460, and the second scuff plate 470 through the longitudinal-beam rear-section rear portion 420. That is, the collision force of the longitudinal-beam rear-section front portion 410 is transferred rearward through two force transfer paths in the up-and-down directions, so the collision force suffered by the vehicle body frame 1 can be dispersed, and a resistance effect of the vehicle body frame 1 to the frontal collision is greatly improved.

Figure 2:
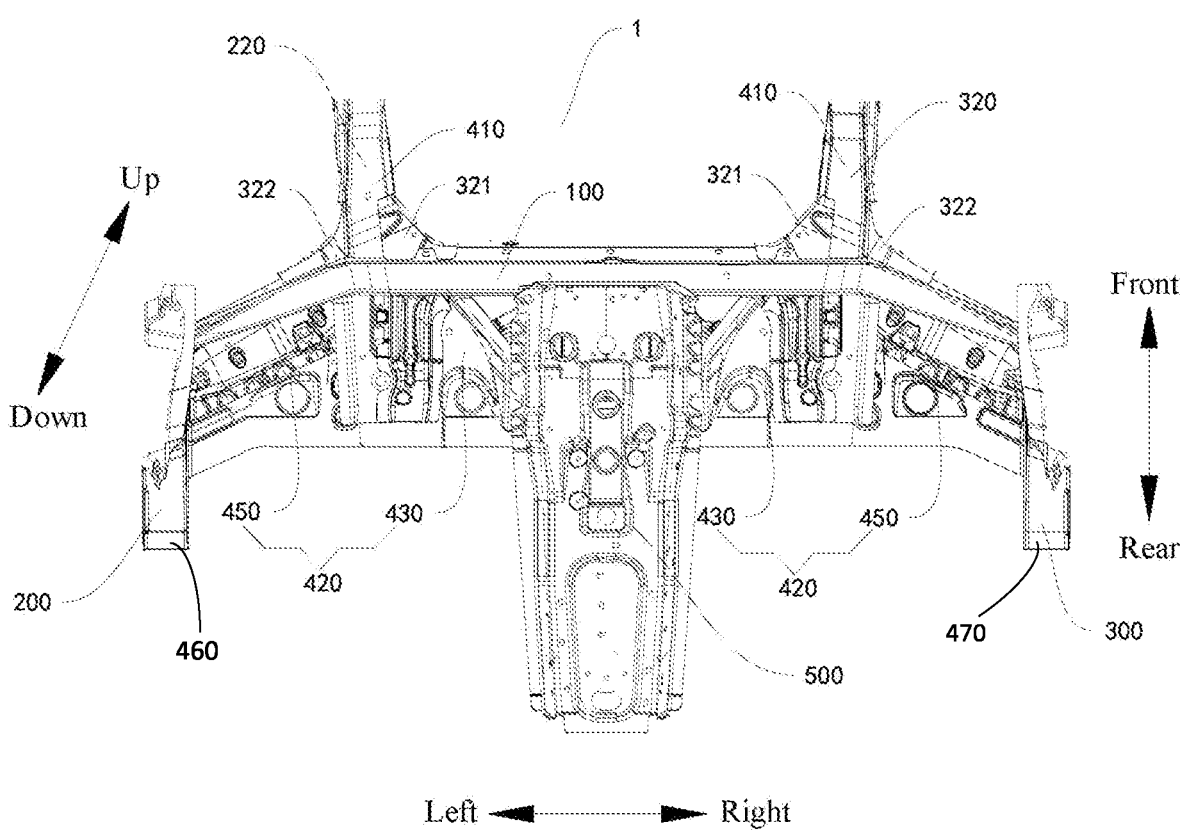
FIG. 2 is a schematic structural view of a vehicle body frame according to an embodiment of the present disclosure.
Figure 3:
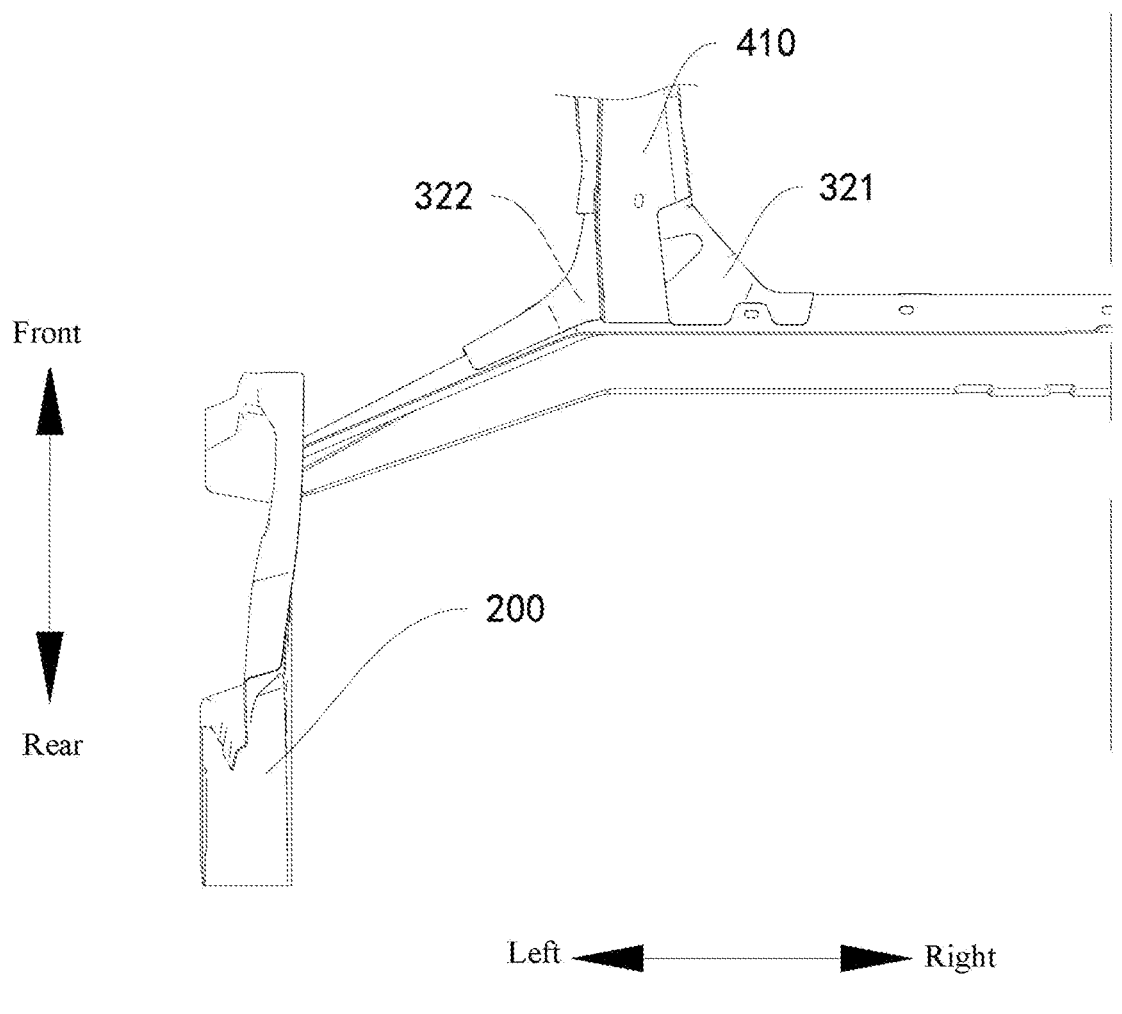
FIG. 3 is a schematic view of connection between a front transverse beam and a longitudinal-beam rear-section front portion of a vehicle body frame according to an embodiment of the present disclosure.

According to some embodiments of the present disclosure, referring to FIG. 2 and FIG. 3, each of the first front longitudinal beam 220 and the second front longitudinal beam 320 may include a first front connection plate 321 and a second front connection plate 322.

The first front connection plate 321 is connected to the front transverse beam 100 and the corresponding longitudinal-beam rear-section front portion 410. The first front connection plate 321 is located on one side of the connected longitudinal-beam rear-section front portion 410. The second front connection plate 322 is connected to the front transverse beam 100 and the corresponding longitudinal-beam rear-section front portion 410. The second front connection plate 322 is located on another side of the connected longitudinal-beam rear-section front portion 410.

The first front connection plate 321 and second front connection plate 322 of the first front longitudinal beam 220 are connected to a left side and a right side of the longitudinal-beam rear-section front portion 410 of the first front longitudinal beam 220. The first front connection plate 321 and second front connection plate 322 of the second front longitudinal beam 320 are connected to a left side and a right side of the longitudinal-beam rear-section front portion 410 of the second front longitudinal beam 320.

Therefore, the first front connection plate 321 and the second front connection plate 322 can strengthen the connection strength between the front transverse beam 100 and the corresponding longitudinal-beam rear-section front portion 410. The collision force suffered by the longitudinal-beam rear-section front portion 410 is more directly applied to the front transverse beam 100. The effectiveness of force transfer is increased, and the collision force suffered by the longitudinal-beam rear-section front portion 410 is greatly shared, so that the force transferred from the longitudinal-beam rear-section front portion 410 to the longitudinal-beam rear-section rear portion 420 may be reduced, so as to maintain structural integrity of the passenger cabin and protect the safety of the passengers.

According to some embodiments of the present disclosure, referring to FIG. 4, one side of the longitudinal-beam rear-section rear portion 420 of the first front longitudinal beam 220 is connected with the first A pillar 200, that is, the longitudinal-beam rear-section rear portion 420 of the first front longitudinal beam 220 can transfer a force to the first A pillar 200. One side of the longitudinal-beam rear-section rear portion 420 of the second front longitudinal beam 320 is connected with the second A pillar 300, that is, the longitudinal-beam rear-section rear portion 420 of the second front longitudinal beam 320 can transfer a force to the second A pillar 300.

In this case, the vehicle body frame 1 has more diverse force transfer paths to provide a sufficient support force for the longitudinal-beam rear-section front portion 410, thereby being beneficial for maintaining a relative position of the longitudinal-beam rear-section front portion 410 in the vehicle body frame 1 to prevent the passengers from being injured.

Figure 5:
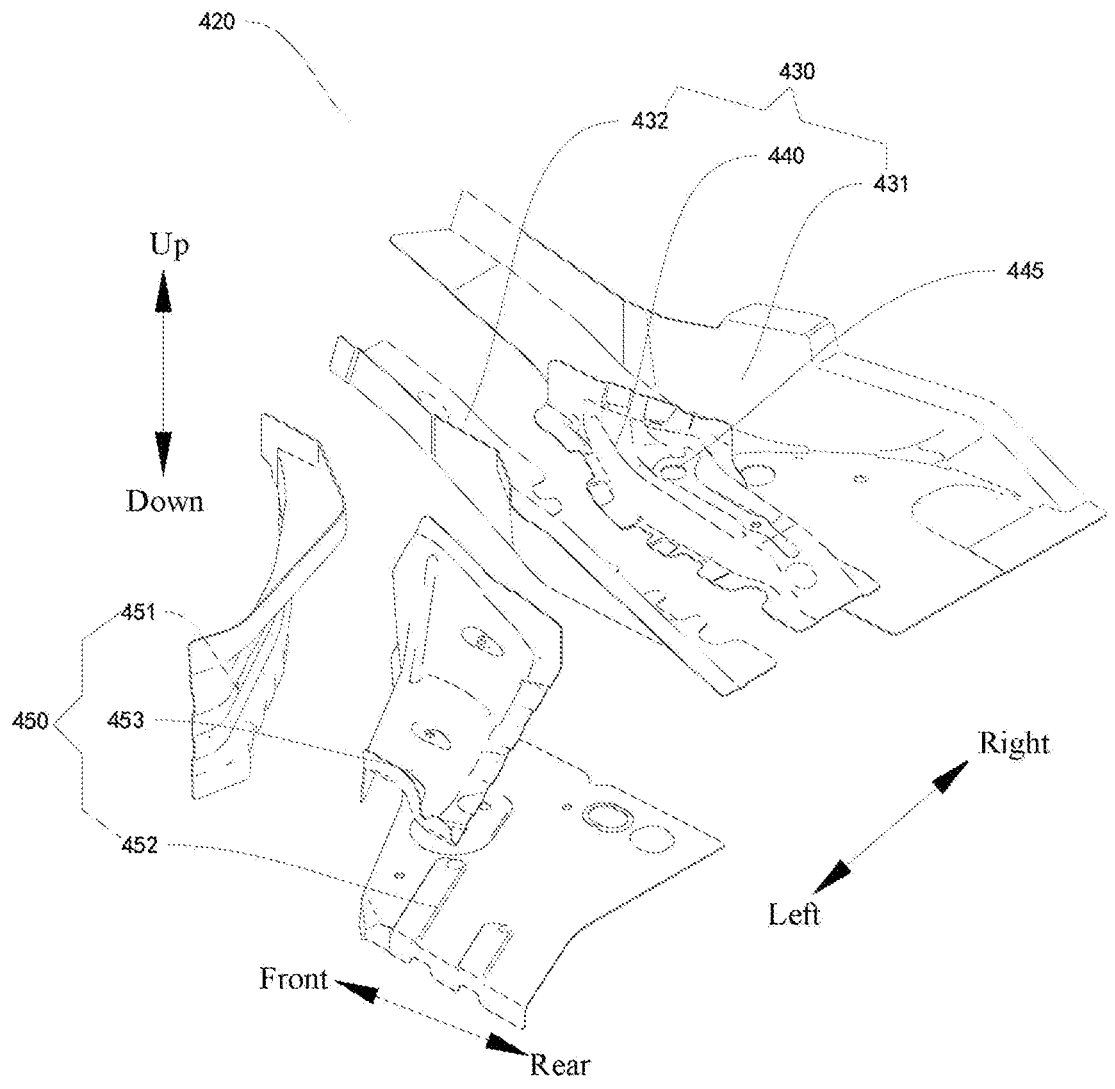
FIG. 5 is an exploded view of a longitudinal-beam rear-section rear portion of a vehicle body frame according to an embodiment of the present disclosure.

According to some embodiments of the present disclosure, referring to FIG. 5, each longitudinal-beam rear-section rear portion 420 includes a rear-section inner side portion 430 and a rear-section outer side portion 450.

The rear-section inner side portion 430 is connected to the central channel 500 and the corresponding longitudinal-beam rear-section front portion 410. The rear-section inner side portion 430 gradually tilts downward from front to rear. The rear-section outer side portion 450 is connected to the corresponding first scuff plate 460 or second scuff plate 470, the corresponding first A pillar 200 or second A pillar 300, the corresponding rear-section inner side portion 430, and the corresponding longitudinal-beam rear-section front portion 410. The rear-section outer side portion 450 is located on one side of the corresponding rear-section inner side portion 430 facing away from the central channel 500. A distance between one side of the rear-section inner side portion 430 of each longitudinal-beam rear-section rear portion 420 facing away from the rear-section outer side portion 450 of the longitudinal-beam rear-section rear portion 420 and one side of the rear-section outer side portion 450 of the longitudinal-beam rear-section rear portion 420 facing away from the rear-section inner side portion 430 of the longitudinal-beam rear-section rear portion 420 gradually increases from front to rear.

For example, a front section of the rear-section inner side portion 430 can withstand a collision force, and a rear end of the rear-section inner side portion 430 can be connected to a floor 800, thereby ensuring a smooth transition of a lower space inside the passenger cabin. Moreover, since the rear-section inner side portion 430 gradually tilts downward from the front to the rear, thereby providing a space for feet of a passenger. In addition, the rear-section outer side portion 450 can improve resistance of the vehicle body frame 1 to an impact of tires on foot positions of the passenger in a small offset collision.

Figure 6:
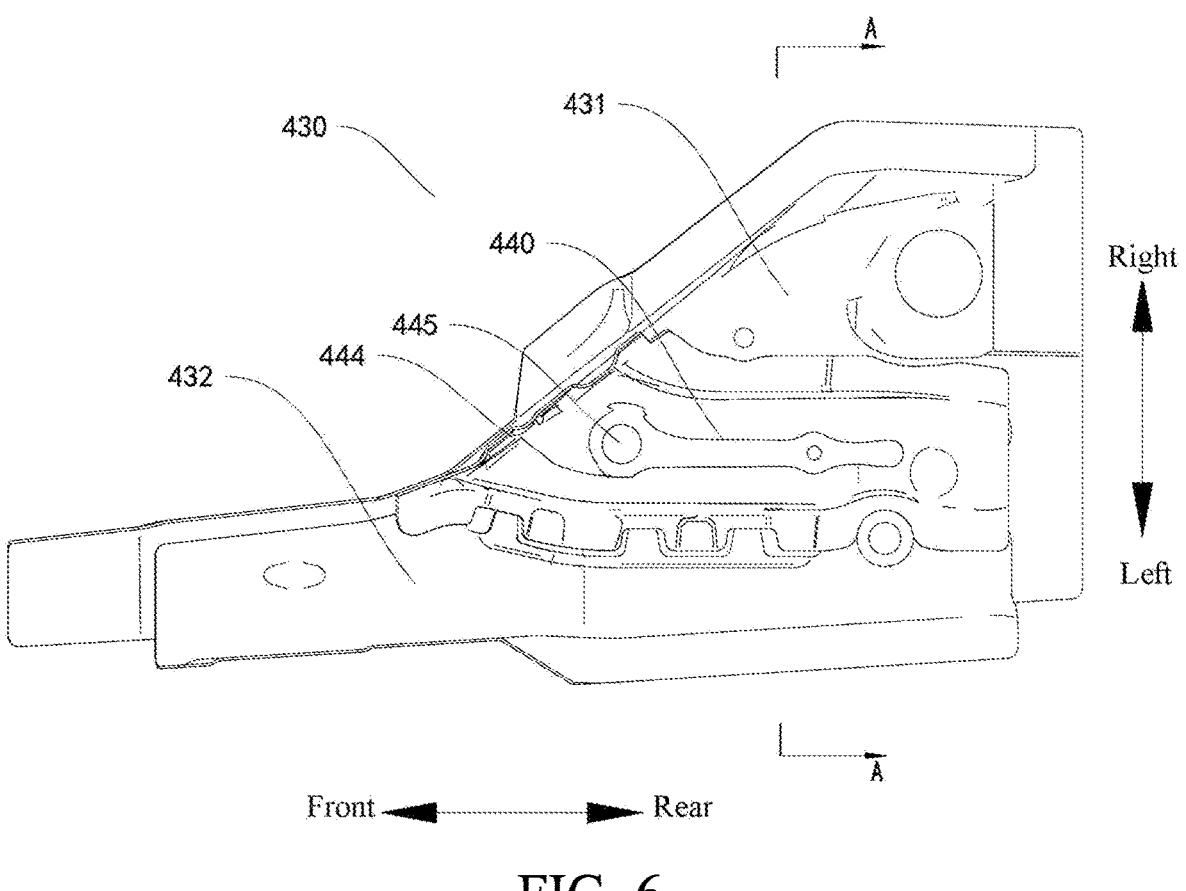
FIG. 6 is a schematic structural view of a rear-section inner side portion of a longitudinal-beam rear-section rear portion of a vehicle body frame according to an embodiment of the present disclosure.
Figure 7:
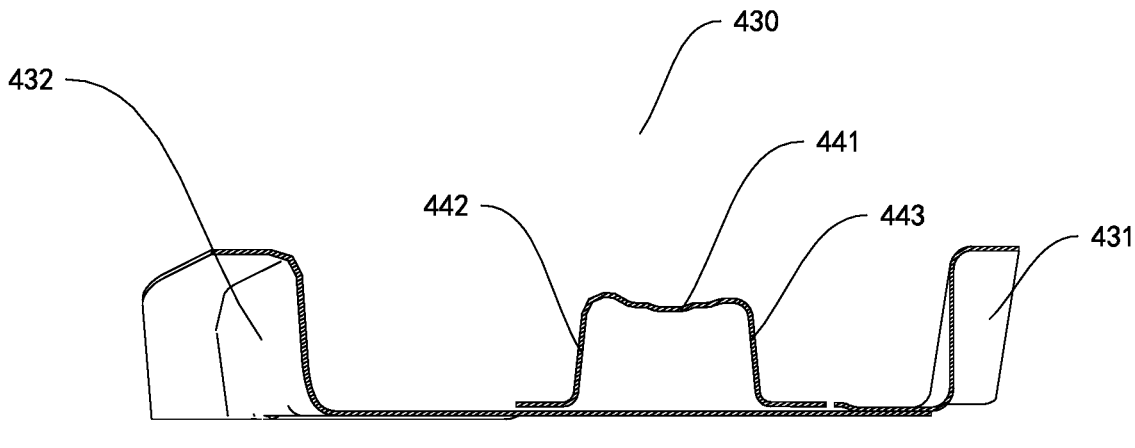
FIG. 7 is a cross-sectional view along a line A-A in FIG. 6.

According to some embodiments of the present disclosure, referring to FIG. 5 to FIG. 7, each rear-section inner side portion 430 includes a rear-section inner plate 431 and a rear-section outer plate 432.

A front end of the rear-section inner plate 431 is connected to the corresponding longitudinal-beam rear-section front portion 410. One side of the rear-section inner plate 431 facing the central channel 500 bends downward and is connected to the central channel 500. A front end of the rear-section outer plate 432 is connected to the corresponding longitudinal-beam rear-section front portion 410. One side of the rear-section outer plate 432 facing away from the central channel 500 bends downward and is connected to the corresponding rear-section outer side portion 450. One side of the rear-section outer plate 432 facing the central channel 500 is connected to the rear-section inner plate 431.

Therefore, the connection strength between the longitudinal-beam rear-section rear portion 420 and the longitudinal-beam rear-section front portion 410 is greatly increased.

Referring to FIG. 5 to FIG. 7, each rear-section inner side portion 430 may include a front auxiliary vehicle body frame support plate 440. A front end of the front auxiliary vehicle body frame support plate 440 is connected to the corresponding longitudinal-beam rear-section front portion 410. The front auxiliary vehicle body frame support plate 440 is connected to an upper surface of the rear-section inner plate 431 and an upper surface of the rear-section outer plate 432. The front auxiliary vehicle body frame support plate 440 is provided with a front auxiliary vehicle body frame mounting hole 445.

In this case, the connection strength between the rear-section inner side portion 430 and the longitudinal-beam rear-section front portion 410 is higher, and the rear-section inner side portion 430 provides a more sufficient support force for the longitudinal-beam rear-section front portion 410. Moreover, the rear-section inner side portion 430 can provide a mounting support for a front auxiliary vehicle body frame. The rear-section inner side portion 430 integrates multiple functions, so that a number of parts of the vehicle body frame 1 may be reduced.

In an embodiment, referring to FIG. 6 and FIG. 7, the front auxiliary vehicle body frame support plate 440 includes a support body 441, a first vertical plate 442, a second vertical plate 443, and a third vertical plate 444.

The support body 441 is spaced from the rear-section inner plate 431 and the rear-section outer plate 432 in the up-and-down directions. The front auxiliary vehicle body frame mounting hole 445 is provided in the support body 441. The first vertical plate 442 is connected to the support body 441 and bends downward. The first vertical plate 442 is connected to the rear-section inner plate 431 and the rear-section outer plate 432. The second vertical plate 443 is connected to the support body 441 and bends downward. The second vertical plate 443 is connected to the rear-section inner plate 431. The third vertical plate 444 is connected to the support body 441 and bends upward. The third vertical plate 444 is connected to the side of the rear-section inner plate 431 facing the central channel 500.

In this case, the front auxiliary vehicle body frame support plate 440 is connected with the rear-section inner plate 431 and the rear-section outer plate 432, thereby greatly increasing structural stability of the rear-section inner side portion 430. Moreover, the front auxiliary vehicle body frame mounting hole 445 is spaced from the rear-section inner plate 431 and the rear-section outer plate 432, and a sleeve for mounting a threaded fastener (such as a bolt) of the auxiliary vehicle body frame 1 has support surfaces for fixing at two ends of the front auxiliary vehicle body frame mounting hole 445, thereby increasing the structural strength of a mounting point of the front auxiliary vehicle body frame 1.

Figure 8:
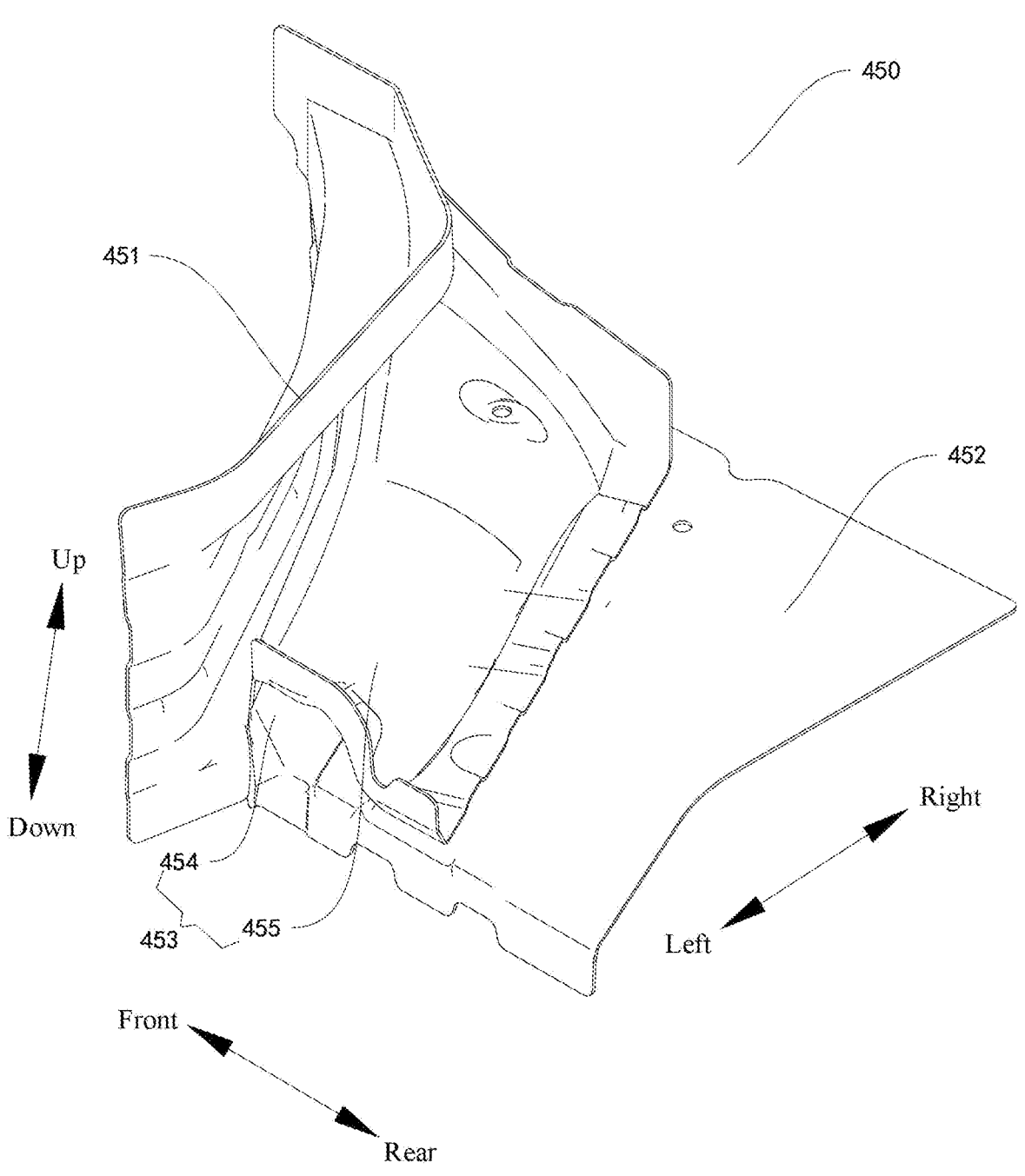
FIG. 8 is a schematic structural view of a rear-section outer side portion of a longitudinal-beam rear-section rear portion of a vehicle body frame according to an embodiment of the present disclosure.

According to some embodiments of the present disclosure, referring to FIG. 5 and FIG. 8, each rear-section outer side portion 450 includes a rear-section closing plate 451 and a first rear connection plate 452.

The rear-section closing plate 451 extends along the left-and-right directions. The rear-section closing plate 451 is connected with the corresponding first A pillar 200 or second A pillar 300, the front transverse beam 100, the corresponding longitudinal-beam rear-section front portion 410, and the corresponding rear-section inner side portion 430. The first rear connection plate 452 (e.g., in a front-and-rear direction) is located behind the rear-section closing plate 451. The first rear connection plate 452, the rear-section closing plate 451, and the corresponding rear-section inner side portion 430 are connected.

For example, a "U"-shaped cross section of the rear-section closing plate 451 may be horizontally arranged, so the rear-section closing plate 451 can have better torsion resistance. When a wheel of a vehicle is impacted, a deflection of the rear-section closing plate 451 into the passenger cabin is avoided. One end of the rear-section closing plate 451 can be supported on a rear end of the longitudinal-beam rear-section front portion 410, so as to increase force transfer efficiency of the longitudinal-beam rear-section front portion 410. Another end of the rear-section closing plate 451 may be connected with the corresponding A pillar. The rear-section closing plate 451 is welded to the lower surface of the front transverse beam 100. Therefore, a double transverse beam structure arranged along the up-and-down directions is formed on a left side and a right side of the vehicle body frame 1, and force transfer efficiency between the longitudinal-beam rear-section front portion 410 and the corresponding A pillar is high. In addition, the longitudinal-beam rear-section front portion 410 can transfer a force to the corresponding scuff plate through the first rear connection plate 452.

Referring to FIG. 5 and FIG. 8, each rear-section outer side portion 450 may include a second rear connection plate 453. The second rear connection plate 453 includes a connection portion 454 and a curved surface portion 455. The connection portion 454 is connected with the rear-section closing plate 451 and the first rear connection plate 452. The curved surface portion 455 extends rearward from the connection portion 454 and has an arc-shaped cross section. The curved surface portion 455 is connected to an upper surface of the first rear connection plate 452. Both the connection portion 454 and the curved surface portion 455 are connected to the rear-section inner side portion 430.

Therefore, a space with an arch-shaped cross section is defined between the second rear connection plate 453 and the first rear connection plate 452. The space can absorb collision energy when a vehicle is subjected to a small offset collision, so as to reduce an impact of tires on a foot space of a driver, thereby increasing stability of the foot space of the driver. Moreover, the space can better transfer the force of each front longitudinal beam to the corresponding scuff plate, thereby enhancing effectiveness of force transfer. The rear-section closing plate 451, the first rear connection plate 452, and the second rear connection plate 453 may be connected (for example, welded) with the rear-section inner side portion 430, so the connection strength between the rear-section outer side portion 450 and the rear-section inner side portion 430 is higher.

According to some embodiments of the present disclosure, referring to FIG. 2 and FIG. 4, the longitudinal-beam rear-section rear portion 420 of the first front longitudinal beam 220 is connected to one side of the first scuff plate 460 close to the second scuff plate 470. The longitudinal-beam rear-section rear portion 420 of the second front longitudinal beam 320 is connected to one side of the second scuff plate 470 close to the first scuff plate 460.

It can be seen that on the one hand, the first front longitudinal beam 220 does not need to be connected to a lower surface of the first scuff plate 460, and the second front longitudinal beam 320 does not need to be connected to a lower surface of the second scuff plate 470, so a space below the first scuff plate 460 and the second scuff plate 470 may be expanded, which is beneficial for the arrangement of a battery pack 900. On the other hand, on the premise of ensuring the overall connection strength of the vehicle body frame 1, a dimension of the vehicle body frame 1 in the left-and-right directions may be reduced, which is beneficial for miniaturization of the vehicle body frame 1.

Figure 9:
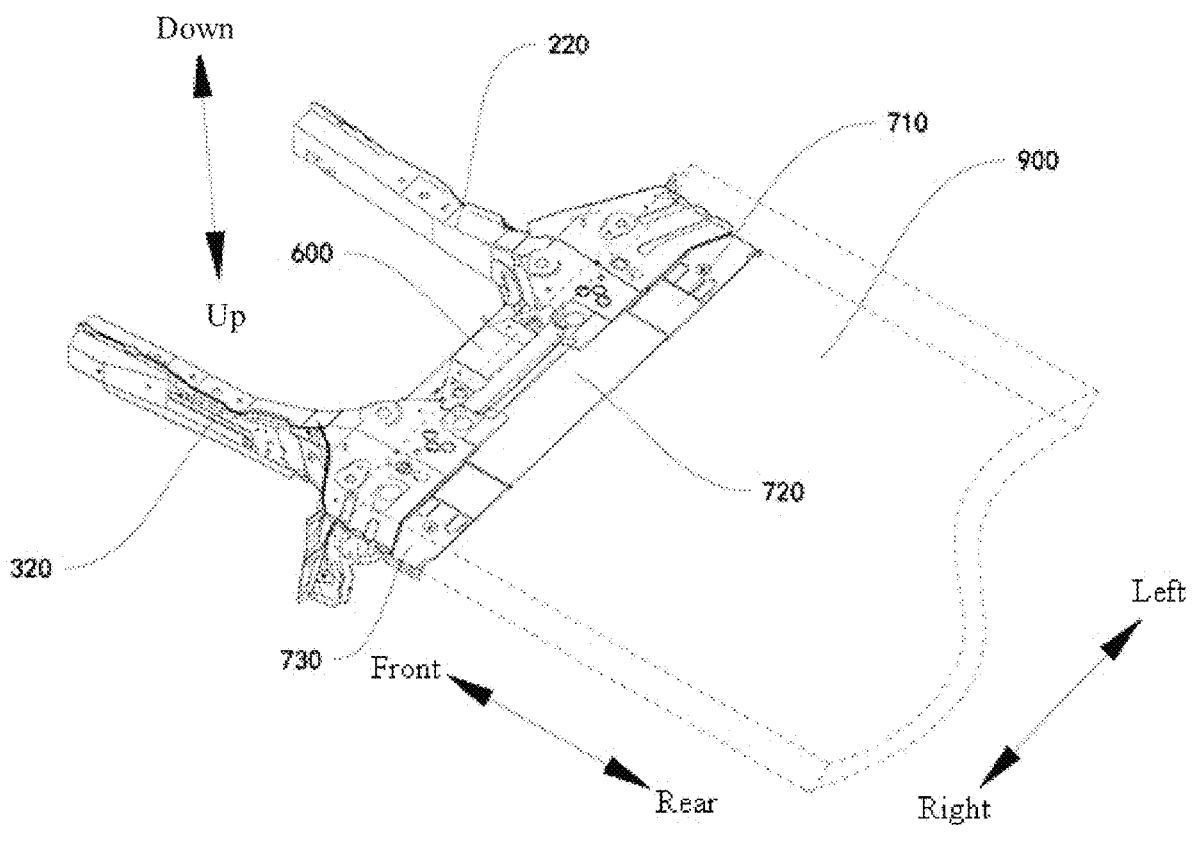
FIG. 9 is a schematic view of connection between a vehicle body frame and a battery pack according to an embodiment of the present disclosure.
Figure 11:
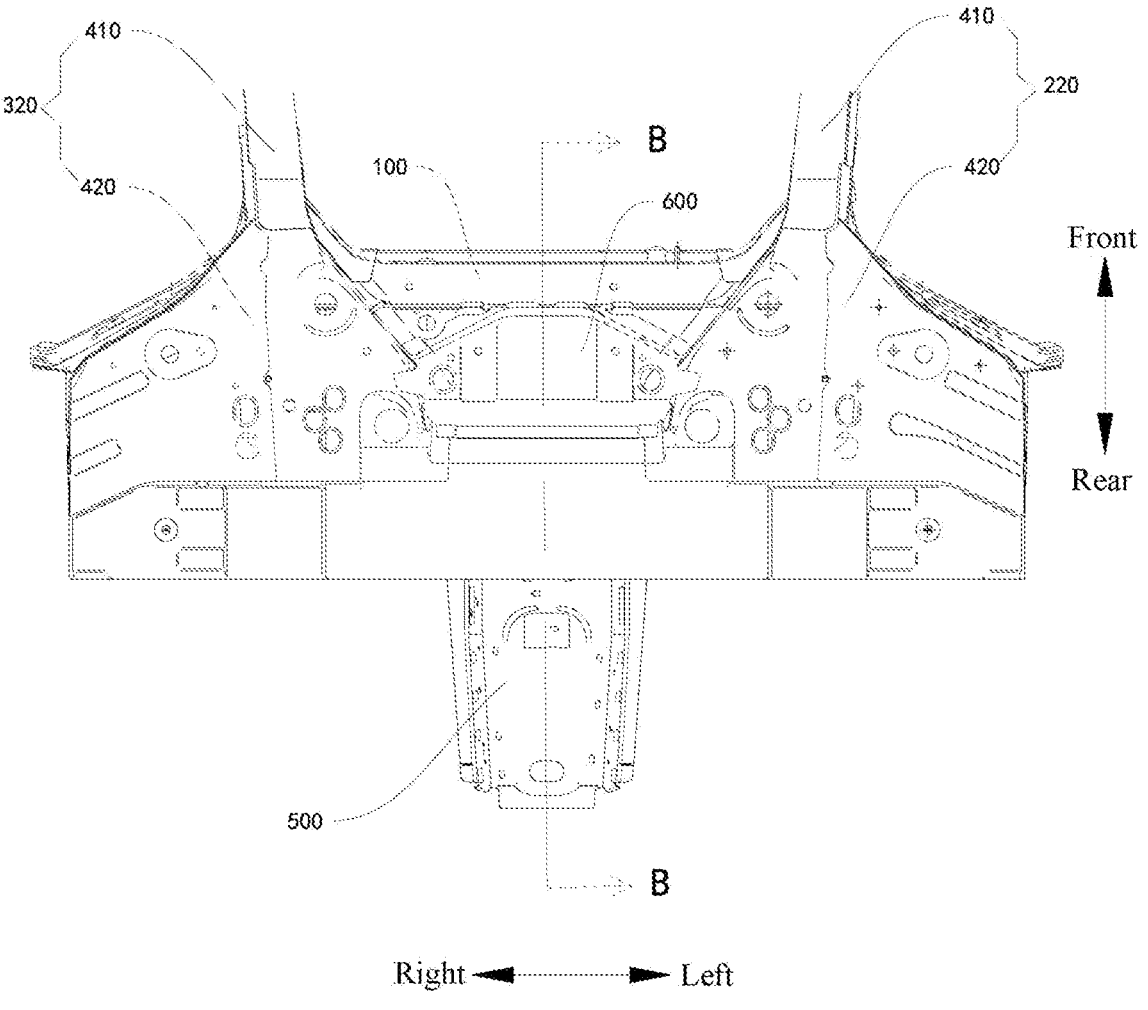
FIG. 11 is a schematic view of connection between a dash board lower transverse beam and a front longitudinal beam of a vehicle body frame according to an embodiment of the present disclosure.
Figure 12:
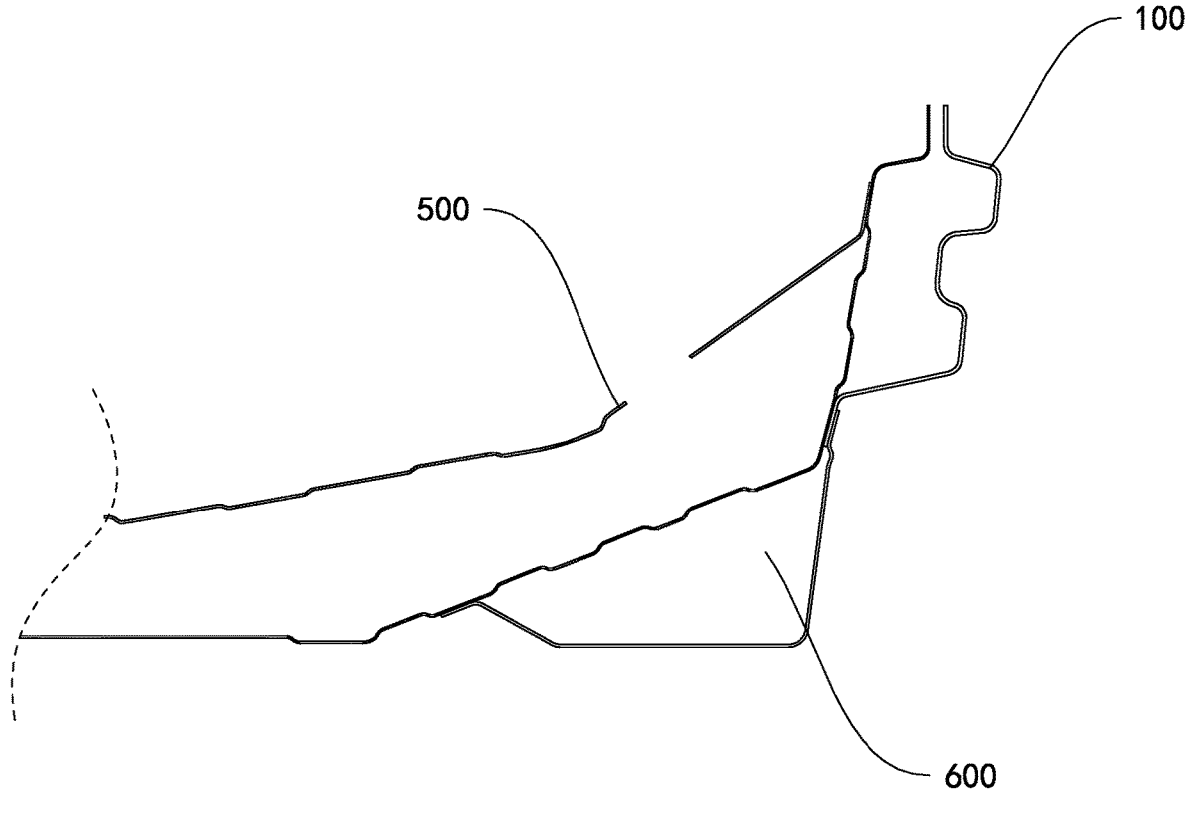
FIG. 12 is a cross-sectional view along a line B-B in FIG. 11.

According to some embodiments of the present disclosure, referring to FIG. 9, FIG. 11, and FIG. 12, the vehicle body frame 1 may include a dash board lower transverse beam 600. The dash board lower transverse beam 600 is connected to the front transverse beam 100 and the central channel 500. The dash board lower transverse beam 600 is located below the central channel 500 (e.g., in an up-and-down direction) and behind the front transverse beam 100 (e.g., in the front-and-rear direction). For example, the dash board lower transverse beam 600 is welded to the lower surface of the front transverse beam 100 to form double transverse beams which are tightly connected and are arranged in the up-and-down directions. Two ends of the dash board lower transverse beam 600 are respectively connected to the longitudinal-beam rear-section rear portion 420 of the first front longitudinal beam 220 and the longitudinal-beam rear-section rear portion 420 of the second front longitudinal beam 320.

For example, the dash board lower transverse beam 600 may be located in front of or above the battery pack 900. The dash board lower transverse beam 600 can prevent liquids and impurities from moving to a surface of the battery pack 900 during wading or air intake of a vehicle in traveling, thereby reducing a corrosion rate of the battery pack 900, and prolonging a service life of the battery pack 900. Moreover, the dash board lower transverse beam 600 can achieve a heat preservation effect on the battery pack 900. In addition, the dash board lower transverse beam 600 can also achieve a treading protection effect on the battery pack 900.

Therefore, the two longitudinal-beam rear-section rear portions 420 can transfer a force to each other in the left-and-right directions through the dash board lower transverse beam 600, and the two longitudinal-beam rear-section rear portions 420 can also transfer a force to the central channel 500 through the dash board lower transverse beam 600.

In addition, the dash board lower transverse beam 600 may be welded to the lower surface of the front transverse beam 100 to form double transverse beams which are tightly connected and are arranged in the up-and-down directions, thereby increasing a bending moment of the dash board lower transverse beam 600 and the front transverse beam 100. The dash board lower transverse beam 600 and the front transverse beam 100 can more effectively resist an impact of the front structure of the vehicle on the passenger cabin during a collision. Moreover, the dash board lower transverse beam 600 is connected with the front transverse beam 100, so as to effectively inhibit a self-torsion tendency of the dash board lower transverse beam 600 and the front transverse beam 100. The dash board lower transverse beam 600 can provide a mounting point for at least one of the auxiliary vehicle body frame and the battery pack 900.

Figure 10:
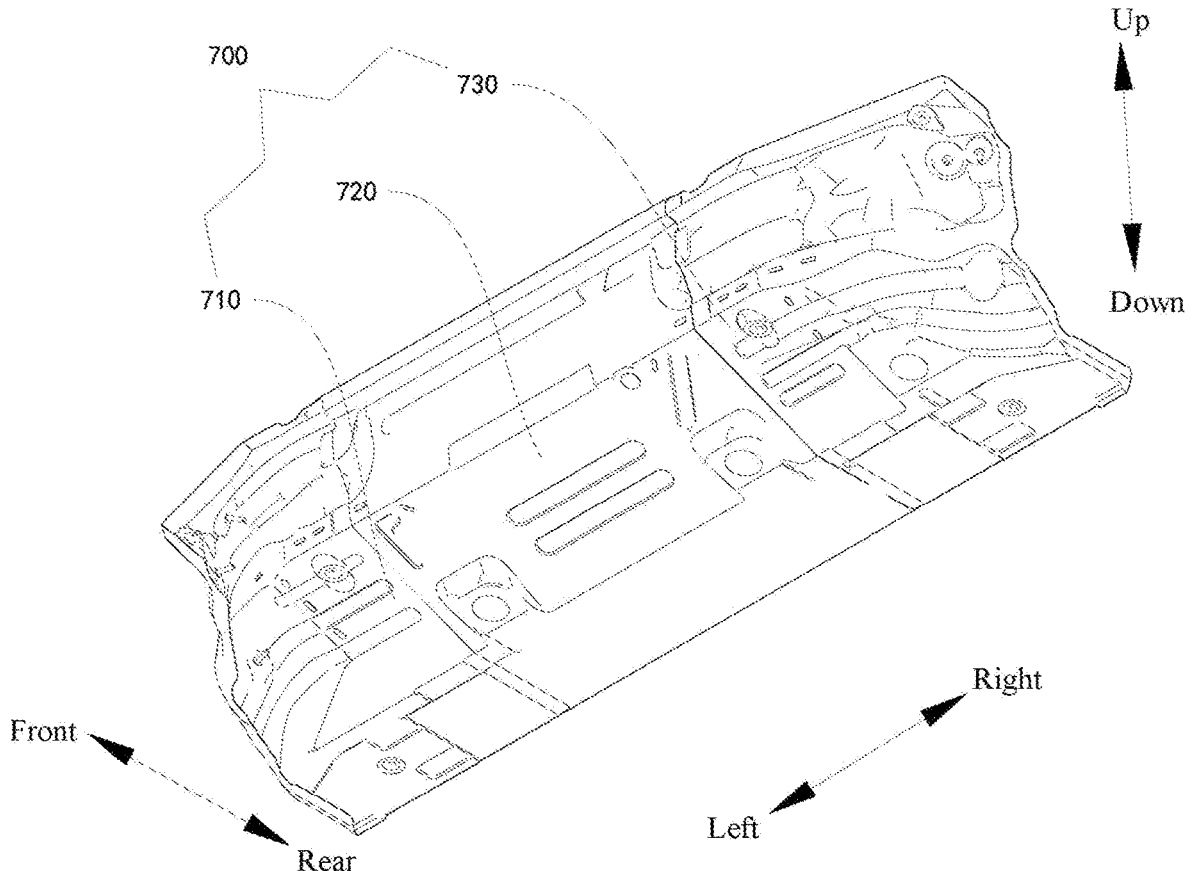
FIG. 10 is a schematic structural view of a dash board reinforcing plate of a vehicle body frame according to an embodiment of the present disclosure.

Further, referring to FIG. 10, the vehicle body frame 1 may include a dash board reinforcing plate 700. The dash board reinforcing plate 700 includes a first plate body 710, a second plate body 720, and a third plate body 730 which are arranged along the left-and-right directions. The second plate body 720 is located between the first plate body 710 and the third plate body 730. The first plate body 710 is connected to the front transverse beam 100, the longitudinal-beam rear-section rear portion 420 of the first front longitudinal beam 220, and the first A pillar 200. The third plate body 730 is connected to the front transverse beam 100, the longitudinal-beam rear-section rear portion 420 of the second front longitudinal beam 320, and the second A pillar 300. The second plate body 720 is connected to the front transverse beam 100, the dash board lower transverse beam 600, and the central channel 500.

For example, the first plate body 710 is welded to the front transverse beam 100, the longitudinal-beam rear-section rear portion 420 of the first front longitudinal beam 220, and the first A pillar 200. The third plate body 730 is welded to the front transverse beam 100, the longitudinal-beam rear-section rear portion 420 of the second front longitudinal beam 320, and the second A pillar 300. The second plate body 720 is welded to the front transverse beam 100, the dash board lower transverse beam 600, and the central channel 500.

In this case, a resistance capacity of the vehicle body frame 1 to a frontal collision may be increased, that is, the structural strength of the vehicle body frame 1 is increased to withstand a greater collision force, so as to improve the safety of the passengers.

In an embodiment, a thickness of the first plate body 710 and a thickness of the third plate body 730 are both greater than a thickness of the second plate body 720. In the arrangement of the vehicle body frame 1, the first plate body 710 and the third plate body 730 need to withstand a greater collision force to increase the resistance capacity of the vehicle body frame 1 to a small offset collision, so the first plate body 710 and the third plate body 730 need to be thicker. Moreover, the second plate body 720 is configured to be thinner, so that a weight of the vehicle body frame 1 may be reduced, and a production cost may be reduced.

In some embodiments of the present disclosure, an upper surface of at least one of the longitudinal-beam rear-section front portion 410, the longitudinal-beam rear-section rear portion 420, and the dash board lower transverse beam 600 is provided with an opening, and the dash board reinforcing plate 700 covers the opening. The longitudinal-beam rear-section front portion 410, the longitudinal-beam rear-section rear portion 420, and the dash board lower transverse beam 600 may be all provided with an opening. The dash board reinforcing plate 700 is located above the longitudinal-beam rear-section front portion 410, the longitudinal-beam rear-section rear portion 420, and the dash board lower transverse beam 600, and covers the openings of the foregoing structures.

Therefore, the load-bearing capability and resistance of the longitudinal-beam rear-section front portion 410, the longitudinal-beam rear-section rear portion 420, and the dash board lower transverse beam 600 may be further increased, thereby further reinforcing the passenger cabin.

In an embodiment, the vehicle body frame 1 may include a floor 800. The central channel 500, each longitudinal-beam rear-section rear portion 420, and the dash board reinforcing plate 700 are connected to the floor 800. The longitudinal-beam rear-section rear portion 420 can transfer a force to the floor 800, and the force is more dispersed. The lower surface of each longitudinal-beam rear-section rear portion 420, a lower surface of the dash board lower transverse beam 600, and a lower surface of the dash board reinforcing plate 700 are not lower than a lower surface of the floor 800.

In this case, there are no parts that interfere with the arrangement of the battery pack 900 below the floor 800, that is, the battery pack 900 can extend to the first scuff plate 460 and the second scuff plate 470 in the left-and-right directions, the dimension of the battery pack 900 in the front-and-rear directions may also be increased, an upper surface of the battery pack 900 is more tightly attached to the lower surface of the floor 800, and the dimension of the battery pack 900 in the up-and-down directions is also increased, so that the vehicle body frame 1 can be equipped with a battery pack 900 with a larger volume to increase the cruising ability of the vehicle.

A vehicle according to an embodiment of the present disclosure is described below with reference to the accompanying drawings. The vehicle includes a vehicle body frame 1 according to the foregoing embodiment of the present disclosure.

By using the vehicle body frame 1 according to the foregoing embodiment of the present disclosure, the vehicle according to this embodiment of the present disclosure has the advantages of high safety, good resistance to a frontal collision, convenient connection, and the like.

Other compositions and operations of the vehicle body frame 1 and the vehicle with the same according to the embodiments of the present disclosure are known to those of ordinary skill in the art, and are not described herein again in detail.

In the description of this specification, description of reference terms such as "an embodiment", "some embodiments", "exemplary embodiments", "example", "specific example", or "some examples" means that features, structures, materials, or characteristics described with reference to the embodiment or example are included in at least one embodiment or example of the present disclosure. In this specification, descriptions of the foregoing terms do not necessarily refer to the same embodiment or example.

Although the embodiments of the present disclosure have been shown and described, those of ordinary skill in the art should understand that various changes, modifications, replacements, and variations may be made to these embodiments without departing from the principles and spirit of the present disclosure, and the scope of the present disclosure is defined by claims and equivalents thereof.

What is claimed is:

1. A vehicle body frame, comprising:

a front transverse beam;

a first front longitudinal beam and a second front longitudinal beam, the first front longitudinal beam and the second front longitudinal beam being disposed at an interval along a left-and-right direction, each of the first front longitudinal beam and the second front longitudinal beam comprising a longitudinal-beam rear-section front portion and a longitudinal-beam rear-section rear portion connected to each other, the longitudinal-beam rear-section front portion being connected to the front transverse beam, and an upper surface of the longitudinal-beam rear-section front portion and an upper surface of the front transverse beam being located in a same plane; and a central channel located behind the front transverse beam in a front-and-rear direction and connected to the front transverse beam, wherein each longitudinal-beam rear-section rear portion comprises a rear-section inner side portion connected to the central channel and the corresponding longitudinal-beam rear-section front portion and gradually tilting downward from front to rear.

2. The vehicle body frame according to claim 1, wherein each of the first front longitudinal beam and the second front longitudinal beam further comprises:

a first front connection plate, wherein the first front connection plate is connected to the front transverse beam and a corresponding longitudinal-beam rear-section front portion, and the first front connection plate is located on a first side of the corresponding longitudinal-beam rear-section front portion; and a second front connection plate, wherein the second front connection plate is connected to the front transverse beam and the corresponding longitudinal-beam rear-section front portion, and the second front connection plate is located on a second side of the corresponding longitudinal-beam rear-section front portion.

3. The vehicle body frame according to claim 1, further comprising:

a first scuff plate and a second scuff plate, the first scuff plate and the second scuff plate being disposed at an interval along the left-and-right direction, a first side of the longitudinal-beam rear-section rear portion of the first front longitudinal beam being connected with the first scuff plate, and a second side of the longitudinal-beam rear-section rear portion of the first front longitudinal beam being connected with the central channel, and a first side of the longitudinal-beam rear-section rear portion of the second front longitudinal beam being connected with the second scuff plate, and a second side of the longitudinal-beam rear-section rear portion of the second front longitudinal beam being connected with the central channel.

4. The vehicle body frame according to claim 3, wherein the longitudinal-beam rear-section rear portion of the first front longitudinal beam is connected to a side of the first scuff plate close to the second scuff plate, and the longitudinal-beam rear-section rear portion of the second front longitudinal beam is connected to a side of the second scuff plate close to the first scuff plate.

5. The vehicle body frame according to claim 3, wherein each longitudinal-beam rear-section rear portion is connected to a lower surface of the corresponding longitudinal-beam rear-section front portion and connected to a lower surface of the central channel.

6. The vehicle body frame according to claim 3, further comprising:

a first A pillar and a second A pillar, the first A pillar and the second A pillar being disposed at an interval along the left-and-right direction, two ends of the front transverse beam being respectively connected to the first A pillar and the second A pillar, the first A pillar being connected with the first scuff plate, the second A pillar being connected with the second scuff plate, one side of the longitudinal-beam rear-section rear portion of the first front longitudinal beam being connected with the first A pillar, and one side of the longitudinal-beam rear-section rear portion of the second front longitudinal beam being connected with the second A pillar.

7. The vehicle body frame according to claim 6, wherein each longitudinal-beam rear-section rear portion comprises:

a rear-section outer side portion, wherein the rear-section outer side portion is connected to the corresponding first scuff plate or second scuff plate, the corresponding first A pillar or second A pillar, the corresponding rear-section inner side portion, and the corresponding longitudinal-beam rear-section front portion, and the rear-section outer side portion is located on a first side of the corresponding rear-section inner side portion facing away from the central channel;

wherein a distance between a second side of the rear-section inner side portion of each longitudinal-beam rear-section rear portion facing away from the rear-section outer side portion of the longitudinal-beam rear-section rear portion and one side of the rear-section outer side portion of the longitudinal-beam rear-section rear portion facing away from the rear-section inner side portion of the longitudinal-beam rear-section rear portion gradually increases from front to rear.

8. The vehicle body frame according to claim 7, wherein each rear-section inner side portion comprises:

a rear-section inner plate, wherein a front end of the rear-section inner plate is connected to the corresponding longitudinal-beam rear-section front portion, and a first side of the rear-section inner plate facing the central channel bends downward and is connected to the central channel; and a rear-section outer plate, wherein a front end of the rear-section outer plate is connected to the corresponding longitudinal-beam rear-section front portion, a first side of the rear-section outer plate facing away from the central channel bends downward and is connected to the corresponding rear-section outer side portion, and a second side of the rear-section outer plate facing the central channel is connected to the rear-section inner plate.

9. The vehicle body frame according to claim 8, wherein each rear-section inner side portion further comprises:

a front auxiliary vehicle body frame support plate, wherein a front end of the front auxiliary vehicle body frame support plate is connected to the corresponding longitudinal-beam rear-section front portion, the front auxiliary vehicle body frame support plate is connected to an upper surface of the rear-section inner plate and an upper surface of the rear-section outer plate, and the front auxiliary vehicle body frame support plate comprises a front auxiliary vehicle body frame mounting hole.

10. The vehicle body frame according to claim 9, wherein the front auxiliary vehicle body frame support plate comprises:

a support body, wherein the support body is spaced from the rear-section inner plate and the rear-section outer plate in an up-and-down direction, and the front auxiliary vehicle body frame mounting hole is disposed in the support body;

a first vertical plate, wherein the first vertical plate is connected to the support body and bends downward, and the first vertical plate is connected to the rear-section inner plate and the rear-section outer plate;

a second vertical plate, wherein the second vertical plate is connected to the support body and bends downward, and the second vertical plate is connected to the rear-section inner plate; and a third vertical plate, wherein the third vertical plate is connected to the support body and bends upward, and the third vertical plate is connected to a first side of the rear-section inner plate facing the central channel.

11. The vehicle body frame according to claim 7, wherein each rear-section outer side portion comprises:

a rear-section closing plate, wherein the rear-section closing plate extends along the left-and-right direction, and the rear-section closing plate is connected with the corresponding first A pillar or second A pillar, the front transverse beam, the corresponding longitudinal-beam rear-section front portion, and the corresponding rear-section inner side portion; and a first rear connection plate, wherein the first rear connection plate is located behind the rear-section closing plate in a front-and-rear direction, and the first rear connection plate is connected with the corresponding first scuff plate or second scuff plate, the rear-section closing plate, and the corresponding rear-section inner side portion.

12. The vehicle body frame according to claim 11, wherein each rear-section outer side portion further comprises:

a second rear connection plate, wherein the second rear connection plate comprises a connection portion and a curved surface portion, the connection portion is connected with the rear-section closing plate and the first rear connection plate, the curved surface portion extends rearward from the connection portion and has an arc-shaped cross section, the curved surface portion is connected to an upper surface of the first rear connection plate, and the connection portion and the curved surface portion are connected to the rear-section inner side portion.

13. The vehicle body frame according to claim 3, further comprising:

a dash board lower transverse beam, wherein the dash board lower transverse beam being connected to the front transverse beam and the central channel, the dash board lower transverse beam being located below the central channel in a up-and-down direction and behind the front transverse beam in the front-and-rear direction, and two ends of the dash board lower transverse beam being respectively connected to the longitudinal-beam rear-section rear portion of the first front longitudinal beam and the longitudinal-beam rear-section rear portion of the second front longitudinal beam.

14. The vehicle body frame according to claim 13, further comprising:

a dash board reinforcing plate, wherein the dash board reinforcing plate comprising a first plate body, a second plate body, and a third plate body disposed along the left-and-right direction, the second plate body being located between the first plate body and the third plate body, the first plate body being connected to the front transverse beam and the longitudinal-beam rear-section rear portion of the first front longitudinal beam, the third plate body being connected to the front transverse beam and the longitudinal-beam rear-section rear portion of the second front longitudinal beam, and the second plate body being connected to the front transverse beam, the dash board lower transverse beam, and the central channel.

15. The vehicle body frame according to claim 1, wherein a width of each longitudinal-beam rear-section rear portion along the left-and-right direction gradually increases from front to rear.

16. The vehicle body frame according to claim 1, further comprising:

a floor, a central channel, each longitudinal-beam rear-section rear portion, and a dash board reinforcing plate being connected to the floor, and a lower surface of each longitudinal-beam rear-section rear portion, a lower surface of a dash board lower transverse beam, and a lower surface of the dash board reinforcing plate being not lower than a lower surface of the floor.

17. A vehicle, comprising a vehicle body frame, wherein the vehicle body frame comprises:

a front transverse beam; and a first front longitudinal beam and a second front longitudinal beam, the first front longitudinal beam and the second front longitudinal beam being disposed at an interval along a left-and-right direction, each of the first front longitudinal beam and the second front longitudinal beam comprising a longitudinal-beam rear-section front portion and a longitudinal-beam rear-section rear portion connected to each other, the longitudinal-beam rear-section front portion being connected to the front transverse beam, and an upper surface of the longitudinal-beam rear-section front portion and an upper surface of the front transverse beam being located in a same plane; and a central channel located behind the front transverse beam in a front-and-rear direction and connected to the front transverse beam, wherein each longitudinal-beam rear-section rear portion comprises a rear-section inner side portion connected to the central channel and the corresponding longitudinal-beam rear-section front portion and gradually tilting downward from front to rear.

18. The vehicle according to claim 17, wherein each of the first front longitudinal beam and the second front longitudinal beam further comprises:

a first front connection plate, wherein the first front connection plate is connected to the front transverse beam and a corresponding longitudinal-beam rear-section front portion, and the first front connection plate is located on a first side of the corresponding longitudinal-beam rear-section front portion; and a second front connection plate, wherein the second front connection plate is connected to the front transverse beam and the corresponding longitudinal-beam rear-section front portion, and the second front connection plate is located on a second side of the corresponding longitudinal-beam rear-section front portion.

19. The vehicle according to claim 17, wherein the vehicle body frame further comprises:

a first scuff plate and a second scuff plate, the first scuff plate and the second scuff plate being disposed at an interval along the left-and-right direction, a first side of the longitudinal-beam rear-section rear portion of the first front longitudinal beam being connected with the first scuff plate, and a first side of the longitudinal-beam rear-section rear portion of the second front longitudinal beam being connected with the second scuff plate.

20. The vehicle according to claim 19, wherein the longitudinal-beam rear-section rear portion of the first front longitudinal beam is connected to a side of the first scuff plate close to the second scuff plate, and the longitudinal-beam rear-section rear portion of the second front longitudinal beam is connected to a side of the second scuff plate close to the first scuff plate.

* * * * *